(12) United States Patent
Smithson et al.

(10) Patent No.: US 6,416,004 B1
(45) Date of Patent: Jul. 9, 2002

(54) SEAT BELT RETRACTOR

(75) Inventors: Alan George Smithson; David Blackadder; Paul Bowman, all of Carlisle (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/542,322

(22) Filed: Apr. 4, 2000

(30) Foreign Application Priority Data

Sep. 17, 1999 (GB) .............................................. 9922105

(51) Int. Cl.$^7$ ............................................... B65H 75/48
(52) U.S. Cl. ......................................................... 242/376
(58) Field of Search ................................. 242/376, 382, 242/382.1, 382.2, 382.3, 382.4, 382.5, 382.6; 403/13, 14, 240, 279, 280, 282, 274, 276

(56) References Cited

U.S. PATENT DOCUMENTS

| | | | |
|---|---|---|---|
| 3,168,961 A | * | 2/1965 | Yates |
| 3,767,135 A | * | 10/1973 | Booth |
| 3,822,840 A | | 7/1974 | Stephenson |
| 4,204,652 A | * | 5/1980 | Cislak et al. |
| 4,285,478 A | | 8/1981 | Stamboulian |
| 4,384,803 A | | 5/1983 | Cachia ........................ 403/345 |
| 4,603,819 A | | 8/1986 | Loose et al. |
| 4,726,538 A | * | 2/1988 | Kovacik et al. |
| 5,087,146 A | * | 2/1992 | Motzet et al. |
| 5,272,930 A | | 12/1993 | Nakamura et al. ............ 74/434 |
| 5,443,223 A | * | 8/1995 | Yosin et al. |
| 5,575,601 A | * | 11/1996 | Skufca et al. |
| 5,857,659 A | | 1/1999 | Kato et al. .................. 248/634 |

FOREIGN PATENT DOCUMENTS

| | | |
|---|---|---|
| DE | 2850758 | 6/1980 |
| DE | 3108632 | 10/1982 |
| DE | G86290878 | 4/1987 |

* cited by examiner

Primary Examiner—William A. Rivera
(74) Attorney, Agent, or Firm—Lonnie Drayer; Jarett Rieger

(57) ABSTRACT

Two parts of a seat belt retractor spool sub-assembly are fixed together in an arrangement with plastically deformable formations on a first ratchet wheel and one end of a spool and corresponding deforming formations on a second ratchet wheel and said one end of the spool. A spool for a seat belt retractor is assembled with a ratchet wheel by: mounting a retractor frame on an assembly jig which has a spring loaded stop; mounting a spool in the frame by aligning the spool axis with the spring loaded stop; and pushing a ratchet wheel onto the end of the spool opposite to that contacting the stop until the ratchet wheel abuts the frame.

7 Claims, 3 Drawing Sheets

SEAT BELT RETRACTOR

FIELD OF THE INVENTION

The present invention relates to a retractor for a vehicle safety restraint seat belt mechanism.

BACKGROUND OF THE INVENTION

A seat belt restraint comprises a length of webbing which is arranged to pass across the torso of a vehicle occupant. The webbing is wound on a rotatable spool which is mounted in a retractor frame. The spool is biased in a webbing wound direction but is otherwise free to pay out webbing to accommodate normal movement of the occupant. In the event of a crash, the spool is locked against rotation and thus against further payout of webbing and the occupant is securely restrained against forward motion. Locking of the spool is effected by bringing a toothed locking pawl into engagement with a ratchet wheel fixed to the spool.

This invention relates to a method of assembling a ratchet wheel to a retractor spool and to an assembled retractor sub-component, and to an apparatus for performing the assembly method.

In high volume assembly lines different sizes of components are handled and this results in a variation in the amount of space between the components. This space is known as the end float and there is currently no way of accurately setting the end float control.

SUMMARY OF THE INVENTION

According to a first aspect of the present invention, there is provided means for fixing together two parts of a vehicle safety restraint retractor spool sub-assembly. The fixing means comprising providing plastically deformable formations on one of the ratchet wheels and one end of the spool and providing corresponding deforming formations on the other of the ratchet wheels and said one end of the spool.

The two parts of the sub-assembly to be fixed together may be, for example, a ratchet wheel and a retractor spool or a spring arbor and the spool.

The plastically deformable formations may be crushable ribs on axially extending pegs or self-locking deformable ears.

The corresponding deforming formations may be drafted holes large enough to accommodate the pegs but small enough to deform or crush the ribs. They will have essentially the same shape as the pegs and are preferably round. Alternatively, the deforming formations may be pegs that fit between the ears to deform them and lock the parts together.

The crushable ribs may be angled or straight sided and likewise the locking ears may have straight or angled inner edges.

The crushable ribs may have angled bottom and straight sides and may incorporate pips on each side of each peg.

An additional, self-locating peg may be provided on one part to aid assembly.

According to a second aspect of the invention, there is provided a retractor sub-assembly comprising a spool and a ratchet wheel, fixed together by co-operation between plastically deformable formations on one part and deforming formations on the other part. Additionally, the retractor sub-assembly may comprise a spring arbor fixed to the other end of the spool by co-operation between plastically deformable formations on one part and deforming formations on the other part. The arbor is pushed on until it is locked in position at a pre-set distance determined by other components such as a mechanism bush and the ratchet.

According to a third aspect of the present invention, there is provided a method of assembling a spool for a vehicle safety restraint retractor to a ratchet wheel. The method comprising of mounting a retractor frame on an assembly jig which has a spring loaded stop; mounting a spool in the frame by aligning the spool axis with the spring loaded stop; and pushing a ratchet wheel onto the end of the spool opposite to that contacting the stop until the ratchet wheel abuts the frame.

BRIEF DESCRIPTION OF THE DRAWINGS

For a better understanding of the present invention and to show how the same may be carried into effect, reference will now be made by way of example to the accompanying drawings in which.

DETAILED DESCRIPTION OF THE INVENTION

Figure 1:
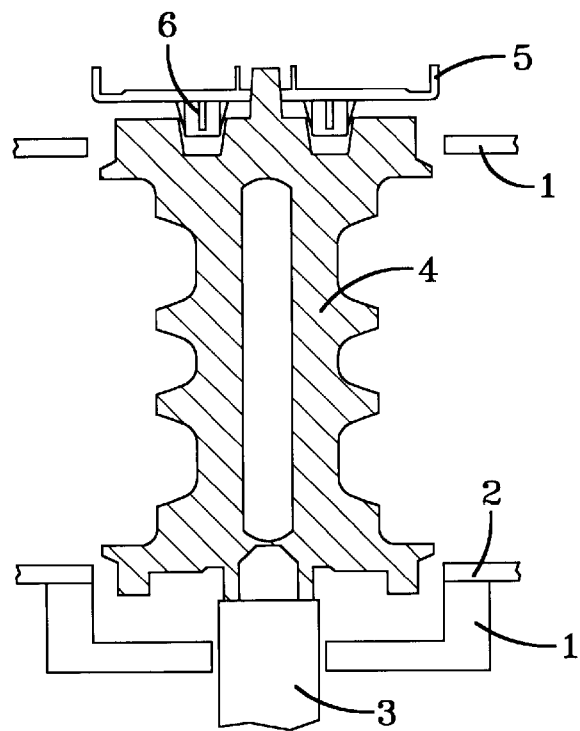
FIG. 1 is a cross-sectional schematic view of a retractor sub-assembly and illustrates a fixing means according to one embodiment of the first aspect of the invention and a method of assembly according to the third aspect of the invention.
Figure 2:
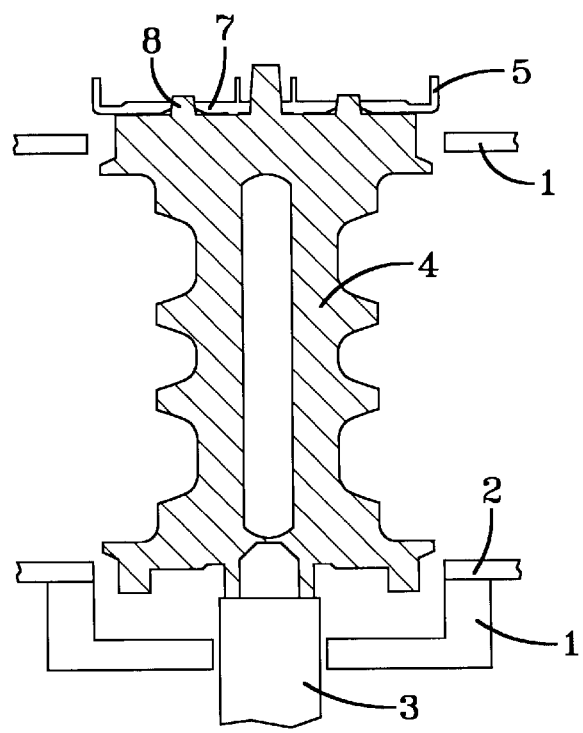
FIG. 2 is a cross-sectional schematic view of a retractor sub-assembly and illustrates a fixing means according to a second embodiment of the invention and an assembly method according to the third aspect of the invention.

In FIG. 1 and FIG. 2, a manufacturing assembly jig 1 is shown on which is located a retractor frame 2 in abutting contract. The jig 1 incorporates a set table spring loaded stop 3. A spool 4 is inserted into the frame 2 and located against the stop 3 which is set to a predetermined position relative to the jig 1.

A ratchet wheel 5, formed of a plastic, is then pushed onto the end of the spool opposite the spring stop 3 until the ratchet wheel 5 stops against the frame 2.

The ratchet wheel is formed in FIG. 1 with extending pegs 6 having crushable ribs around their edges and the spool 4 is formed with corresponding round drafted holes which crush the ribs on pegs 6 and lock the spool 4 to the ratchet wheel 5.

In FIG .2, the ratchet wheel has self-locking ears 7 and the spool has extending pegs 8 which interact to lock the tow components together.

The amount of spool end float is controlled by the setting on the spring-loaded stop 3.

Figure 3:
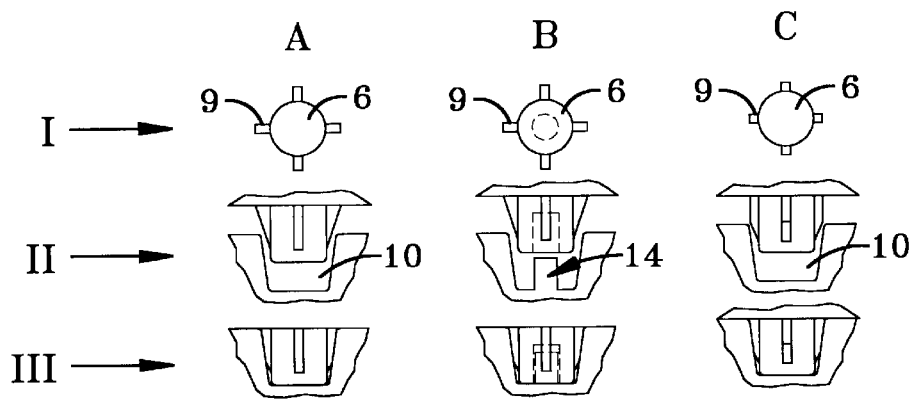
FIG. 3/FIG. 4 are plan view and cross-sectional views of various modifications of a part of FIG. 1.
Figure 4:
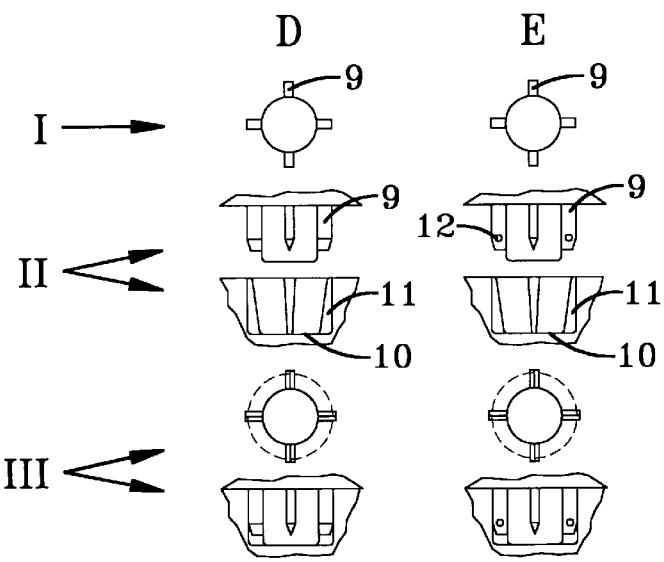
Figure 5:
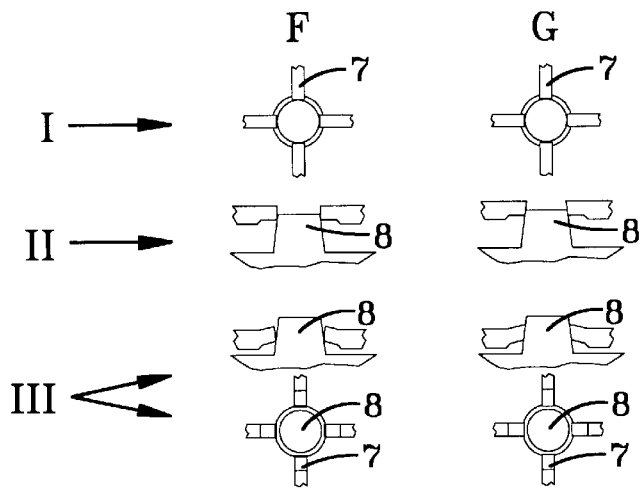
FIG. 5 shows a plan view and cross-sectional view of a modification of part of FIG.2.

Various modifications to the means of fixing the ratchet wheel 5 to the spool 4 are shown in FIG. 3 to FIG. 5.

FIG. 3 and FIG. 4 show modifications to the crushable rib formations of FIG. 1 and FIG. 5 show modifications to the self-locking ears of FIG. 2.

In each figure, line I is a plan view of the peg/ear on the ratchet wheel 5, line II is a cross-sectional view of the fixing formations as the two parts are brought together and line III shows the assembled formations.

In FIG. 3, A and B show pegs 6 with angled ribs 9 which lock into round drafted holes 10 in the spool 4. In C, the ribs 9 are straight-sided. In B, a self-locating peg 14 is provided in the hole 10 in spool 4 to aid assembly.

In FIG. 4, D has ribs 9 with straight sides and an angled bottom on the peg 6 and the hole 10 has drafted crush locations 11. E has ribs 9 also with straight sides and an angled bottom but with pips 12 on each side of each leg and with slightly larger crush locations 11 in the hole 10.

In FIG. 5, the self-locking ears 7 on the ratchet wheel have straight inner edges in F and angled inner edges in G. The angled inner edges sit more snugly against the spool pegs 8 as can be seen in GIII (FIG.5).

Figure 6:
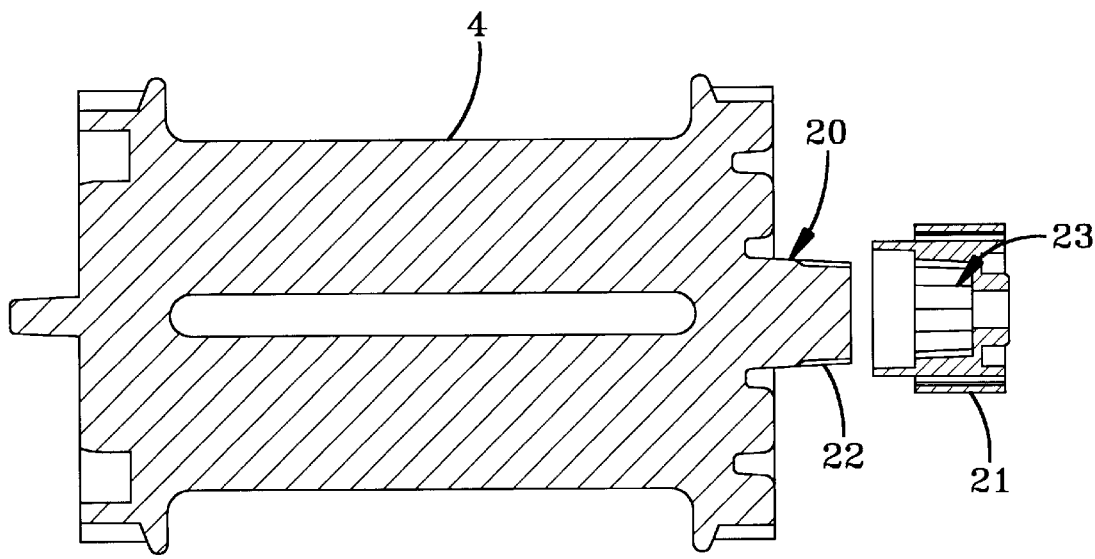
FIG. 6 is a cross-sectional axial view of a retractor sub-assembly and illustrates a fixing means according to a third embodiment of the first aspect of the invention.
Figure 7:
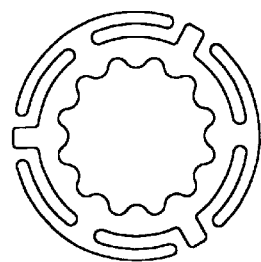
FIG. 7 is a cross-sectional end view of part of FIG.6.

In FIGS. 6 and 7 the retractor spool 4 has an axial spool spline extension 20 onto which a spring arbor 21 fits. The extension 20 is generally cylindrical with longitudinal shaped ridges on the surface forming deformable crush ribs 22 which are axially oriented around the outer surface of the extension 20. The arbor 21 has corresponding mating shapes 23 on the inside surface. The crush ribs have a slightly bigger angle than the spool splines 20.

Many changes and modifications in the above-described embodiments of the invention can, of course, be carried out without departing from the scope thereof. Accordingly, that scope is intended to be limited only by the scope of the appended claims.

We claim:

1. An arrangement for fixing together two parts of a seat belt retractor spool sub-assembly comprising plastically deformable formations on a first ratchet wheel and one end of a spool and corresponding deforming formations on a second ratchet wheel and said one end of the spool, wherein the plastically deformable formations are crushable ribs on axially extending pegs.

2. The arrangement for fixing together two parts of a seat belt retractor spool sub-assembly of claim 1 wherein the corresponding deforming formations are drafted holes large enough to accommodate the pegs but small enough to deform or crush the ribs.

3. The arrangement for fixing together two parts of a seat belt retractor spool sub-assembly of claim 2 wherein the drafted holes have essentially the same shape as the pegs.

4. The arrangement for fixing together two parts of a seat belt retractor spool sub-assembly of claim 1 wherein the crushable ribs have angled bottoms and straight sides and there are pips on each side of each peg.

5. A seat belt retractor sub-assembly comprising a spool and a ratchet wheel fixed together by co-operation between plastically deformable formations on one part and deforming formations on the other part, wherein the plastically deformable formations are crushable ribs on axially extending pegs, a spring arbor fixed to the other end of the spool by co-operation between plastically deformable formations on one part and deforming formations on the other part.

6. The seat belt retractor sub-assembly of claim 5 wherein the arbor is pushed on until it is locked in position at a pre-set distance determined by other components.

7. An arrangement for fixing together two parts of a seat belt retractor spool sub-assembly comprising plastically deformable formations on a first ratchet wheel and one end of a spool and corresponding deforming formations on a second ratchet wheel and said one end of the spool, wherein the plastically deformable formations are self-locking deformable ears, the spool has pegs that fit between the ears to lock the spool to the ratchet wheel.

* * * * *